US012152739B2

(12) United States Patent
Liang

(10) Patent No.: US 12,152,739 B2
(45) Date of Patent: Nov. 26, 2024

(54) LAMP

(71) Applicant: Nanning City Hong Cai Illuminations Technology Company Limited, Guangxi (CN)

(72) Inventor: Faquan Liang, Nanning (CN)

(73) Assignee: Nanning City Hong Cai Illuminations Technology Company Limited, Nanning (CN)

( * ) Notice: Subject to any disclaimer, the term of this patent is extended or adjusted under 35 U.S.C. 154(b) by 0 days.

(21) Appl. No.: 18/239,768

(22) Filed: Aug. 30, 2023

(65) Prior Publication Data

US 2024/0353073 A1 Oct. 24, 2024

(30) Foreign Application Priority Data

Apr. 24, 2023 (CN) ........................ 202320951551.0

(51) Int. Cl.
*F21K 9/235* (2016.01)

(52) U.S. Cl.
CPC .................................... *F21K 9/235* (2016.08)

(58) Field of Classification Search
CPC ....................................................... F21K 9/235
See application file for complete search history.

(56) References Cited

U.S. PATENT DOCUMENTS

| | | | | |
|---|---|---|---|---|
| 2018/0350584 | A1* | 12/2018 | Fu | F21K 9/232 |
| 2018/0372278 | A1* | 12/2018 | Zhang | F21K 9/237 |
| 2019/0195435 | A1* | 6/2019 | Ye | F21K 9/232 |
| 2019/0257478 | A1* | 8/2019 | Wang | F21K 9/238 |
| 2019/0323695 | A1* | 10/2019 | Wu | F21V 23/003 |
| 2020/0292138 | A1* | 9/2020 | Crayford | F21K 9/235 |
| 2022/0120387 | A1* | 4/2022 | Yan | F21K 9/238 |
| 2022/0136660 | A1* | 5/2022 | Huang | F21K 9/232 362/363 |
| 2023/0258303 | A1* | 8/2023 | Huang | F21K 9/235 315/185 R |

* cited by examiner

*Primary Examiner* — Kevin Quarterman

(57) ABSTRACT

Provided is a lamp, comprising a lamp holder assembly and a bulb assembly; the lamp holder assembly comprises a first conductive terminal, a second conductive terminal and a lamp holder provided with a plug hole, both the conductive terminals are installed on an inner wall of the plug hole; the bulb assembly comprises a light-emitting body, a block and a lamp housing, the lamp housing is provided with an internal space and a first through hole, the block is hermetically installed in the first through hole, and the light-emitting body is installed in the internal space through the block; and when the bulb assembly is installed on the lamp holder assembly, the lamp holder is sleeved on the block and the lamp housing through the plug hole, and two output ends of the light-emitting body pass through the block and are connected with the first and second conductive terminal respectively.

8 Claims, 4 Drawing Sheets

LAMP

CROSS REFERENCE TO RELATED APPLICATIONS

The present application claims the benefit of Chinese Patent Application No. 202320951551.0 filed on Apr. 24, 2023, the contents of which are incorporated herein by reference in their entirety.

TECHNICAL FIELD

The present application belongs to the technical field of light bulbs, in particular to a lamp.

BACKGROUND

Incandescent lamps have been gradually eliminated by society because they are not environmentally friendly and often provide relatively low color rendering index. As an environmentally friendly material, light emitting diode (LED) can directly convert electric energy into light energy, thus achieving the effect of lighting, and LED has gradually become the mainstream lighting in the society.

In the prior art, the bottom of a light bulb is a positive electrode, the side of the light bulb is sleeved with an aluminum sleeve of a negative electrode, and the outer wall of the aluminum shell is provided with external threads. The lamp holder adapted to the bulb is provided with an internal thread hole, and the bulb is installed on the lamp holder through the threaded external thread and the internal thread hole, and the aluminum sleeve of the bulb abuts against the inner wall of the internal thread hole to complete the connection of the negative electrode, and the bottom of the bulb abuts against the bottom of the internal thread hole to complete the connection of the positive electrode. However, for the threaded bulb and the lamp holder, external threads are required on the bulb, and the lamp holder is provided with internal thread holes, which makes the manufacturing process of the bulb and the lamp holder complicated, increases the manufacturing cost of the bulb and the lamp holder, and the assembly operation between the bulb and the lamp holder is not simple.

SUMMARY

The present application provides a lamp aiming at the technical problems of high manufacturing cost and inconvenient assembly and disassembly of light bulbs and lamp holders in the prior art.

In view of the above technical problems, the embodiment of the present application provides a lamp, which includes a lamp holder assembly and a bulb assembly; the lamp holder assembly includes a first conductive terminal, a second conductive terminal and a lamp holder provided with a plug hole, both the first conductive terminal and the second conductive terminal are installed on an inner wall of the plug hole;

the bulb assembly includes a light-emitting body, a block and a lamp housing, the lamp housing is provided with an internal space and a first through hole communicating with the internal space, the block is hermetically installed in the first through hole, and the light-emitting body is installed in the internal space through the block; and when the bulb assembly is installed on the lamp holder assembly, the lamp holder is sleeved on the block and the lamp housing through the plug hole, a first output end of the light-emitting body passes through the block and is connected with the first conductive terminal, and a second output end of the light-emitting body passes through the block and is connected with the second conductive terminal.

Optionally, the bulb assembly further includes a housing sleeve provided with a second through hole, and the housing sleeve is sleeved on the lamp housing through the second through hole; the lamp holder is sleeved on the block and the housing sleeve through the plug hole; and the block includes a sealing blocking part, an insertion part and abutting part connected between the sealing blocking part and the insertion part, and an outer diameter of the abutting part is larger than that of the sealing blocking part and the insertion part; the sealing blocking part is hermetically installed in the first through hole, the insertion part is inserted in the plug hole, and the housing sleeve presses the abutting part on the lamp housing.

Optionally, an outer wall of the lamp house is provided with a first clamping arm, and an inner wall of the second through hole is provided with a second clamping arm, and the housing sleeve is sleeved on the lamp housing through the first clamping arm and the second clamping arm which are butted against each other.

Optionally, the bulb assembly further includes a locking fastener, the locking fastener is sleeved on the housing sleeve and connected with the lamp holder.

Optionally, the locking fastener is provided with a locking convex arm, the lamp holder is provided with a lock hole, and the locking fastener is connected with the lamp holder through the locking convex arm inserted into the lock hole.

Optionally, the lamp holder is further provided with a clamping groove communicating with the plug hole, an end of the first conductive terminal away from the light-emitting body is provided with a first needle extending into the clamping groove, and an end of the second conductive terminal away from the light-emitting body is provided with a second needle extending into the clamping groove;

the lamp also includes a first wire and a second wire clamped in the clamping groove, the first needle is inserted into the first wire and electrically connected with the first wire, and the second needle is inserted into the second wire and electrically connected with the second wire.

Optionally, the lamp holder includes a holder cover and a holder body provided with the plug hole and the clamping groove, the holder cover covers the clamping groove and is used for pressing the first wire and the second wire in the clamping groove.

Optionally, the lamp holder is provided with a hook.

Optionally, the light-emitting body includes a first conductive bracket, a second conductive bracket and an LED lamp bead installed between the first conductive bracket and the second conductive bracket, the first conductive bracket passes through the block and is connected with the first conductive terminal, and the second conductive bracket passes through the block is connected with the second conductive terminal.

Optionally, the lamp housing is a plastic piece.

In the present application, the block is hermetically installed in the first through hole; when the bulb assembly is installed on the lamp holder assembly, the lamp holder is sleeved on the block and the lamp housing, an end of the block away from the light-emitting body extends into the plug hole, and the first output end of the light-emitting body is connected with the first conductive terminal after passing through the block, and the second output end of the light-emitting body is connected with the second conductive terminal after passing through the block. In this way, the electrical connection between the positive electrode of the light-emitting body and the first conductive terminal, and the electrical connection between the negative electrode of the light-emitting body and the second conductive terminal are realized. In the present application, there is no need to provide an aluminum negative sleeve with external threads on the lamp housing, thus reducing the manufacturing process and cost of the bulb assembly, which is beneficial to the automatic batch production of the bulb assembly. In addition, the bulb assembly is directly sleeved on the block and the housing, so that the disassembly between the lamp holder assembly and the bulb assembly is simple.

BRIEF DESCRIPTION OF DRAWINGS

The present application is further illustrated with the attached drawings and following embodiments.

Figure 1:
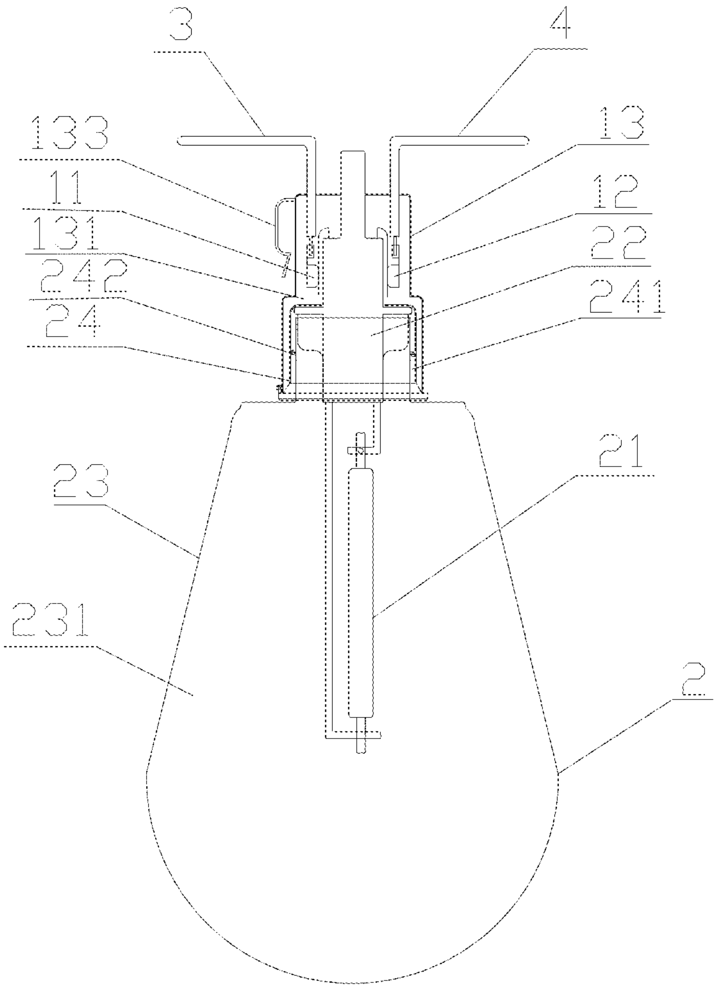
FIG. 1 is a schematic diagram of a lamp provided by an embodiment of the present application.

The reference signs in the drawings are as follows:

1. Lamp holder assembly; 11. First conductive terminal; 111. First needle; 12. Second conductive terminal; 121. Second needle; 13. Lamp holder; 131. Plug hole; 132. Lock hole; 133. Hook; 134. Holder cover; 135. Holder body; 136. Clamping groove; 2. Bulb assembly; 21. Light-emitting body; 211. First conductive bracket; 212. Second conductive bracket; 213. Led lamp bead; 22. Block; 221. Sealing blocking part; 222. Insertion part; 223. Abutting part; 23. Lamp housing; 231. Internal space; 232. First through hole; 234. First clamping arm; 24. Housing sleeve; 241. Second through hole; 242. Second clamping arm; 25. Locking fastener; 251. Locking convex arm; 3. First wire; 4. Second wire.

DETAILED DESCRIPTION THE PREFERRED EMBODIMENTS

In order to make the beneficial effects, technical solutions and technical problems solved by the present application clearer, the present application will be further illustrated in detail with reference to the drawings and embodiments. It should be understood that the specific embodiments described here are merely for illustrating the present application, not for limiting the present application.

It should be understood that the directions or positional relationships indicated by the terms “upper”, “lower”, “left”, “right”, “front”, “back” and “middle” are based on the directions or positional relationships shown in the drawings, only for convenience of describing the present application and simplifying the descriptions, instead of indicating or implying that the device or element must have a specific orientation, be constructed or operated in a specific orientation, and therefore cannot be understood as a limitation of the present application.

Figure 2:
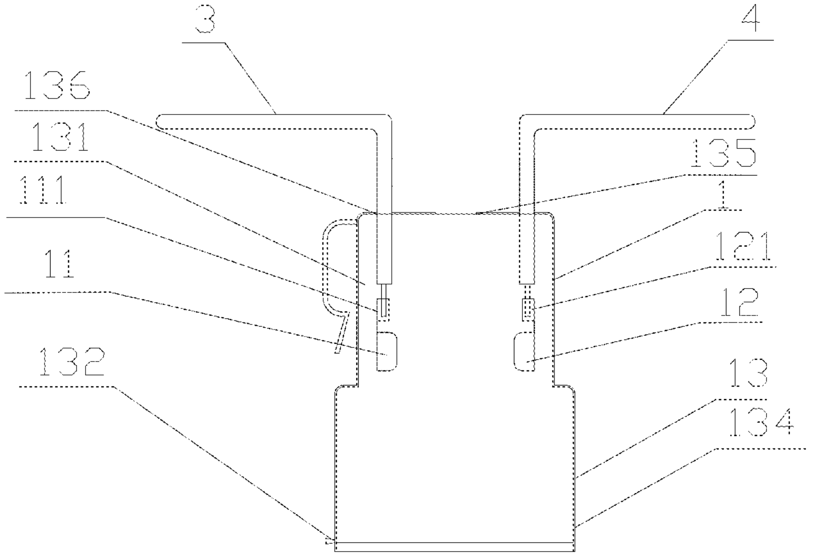
FIG. 2 is a schematic diagram of a lamp holder assembly of a lamp provided by an embodiment of the present application.
Figure 3:
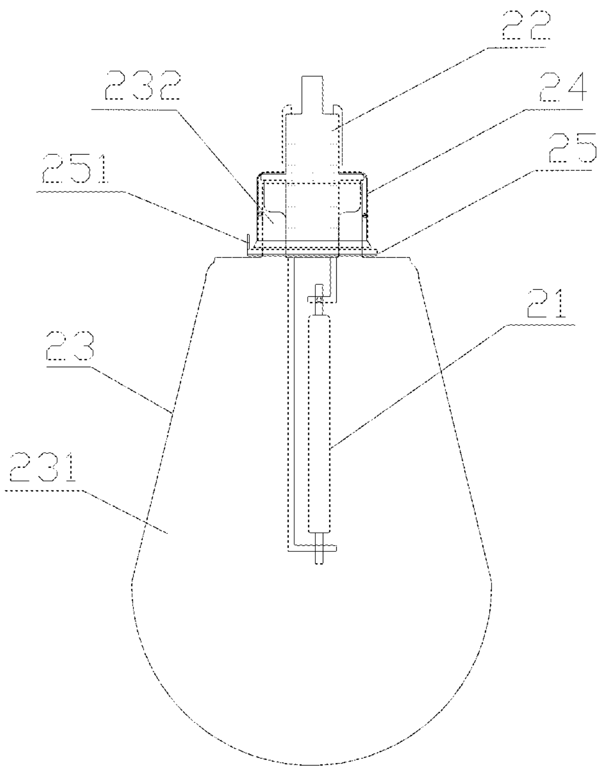
FIG. 3 is a schematic diagram of LED lamp beads installed in a bulb assembly through a conductive bracket.

As shown in FIG. 1 to FIG. 3, an embodiment of the present application provides a lamp, including a lamp holder assembly 1 and a bulb assembly 2; the lamp holder assembly 1 includes a first conductive terminal 11, a second conductive terminal 12 and a lamp holder 13 provided with a plug hole 131; the first conductive terminal 11 and the second conductive terminal 12 are both installed on the inner wall of the plug hole 131. Understandably, the lamp housing 23 may be a plastic piece, for example, the lamp housing 23 may be made of materials such as PET (Polyethylene terephthalate), PC (Polycarbonate), etc. Preferably, the lamp housing 23 is made of PC material, and the plastic lamp housing 23 made of PC material has high transparency, can withstand high temperature, and has the function of preventing ultraviolet rays. The first conductive terminal 11 and the first conductive terminal 11 are respectively installed on two opposite inner side walls of the plug hole 131, and the block 22 may be made of insulating materials such as silica gel.

It should be noted that the first conductive terminal 11 and the second conductive terminal 12 may be a live conductive terminal and a zero conductive terminal, respectively, or a positive conductive terminal and a negative conductive terminal, respectively. Therefore, the bulb assembly 2 can supply AC power and DC power, thus improving the applicability of the lamp.

The bulb assembly 2 includes a light-emitting body 21, a block 22 and a lamp housing 23, the lamp housing 23 is provided with an internal space 231 and a first through hole 232 communicating with the internal space 231, the block 22 is hermetically installed in the first through hole 232, and the light-emitting body 21 is installed in the internal space 231 through the block 22. Understandably, when the lamp housing 23 is not installed on the lamp holder 13, the lower end of the block 22 is hermetically installed in the first through hole 232, and the upper end of the block 22 protrudes from the first through hole 232. The block 22 can not only seal and block the first through hole 232, but also support the light-emitting body 21, so that the light-emitting body 21 is suspended in the internal space 231.

When the bulb assembly 2 is installed on the lamp holder assembly 1, the lamp holder 13 is sleeved on the block 22 and the lamp housing 23 through the plug hole 131. The positive electrode of the light-emitting body 21 is connected to the first conductive terminal 11 after passing through the block 22, and the negative electrode of the light-emitting body 21 is connected to the second conductive terminal 12 after passing through the block 22. Understandably, the upper part of the block 22 and the upper part of the lamp housing 23 are both inserted into the plug hole 131. The positive electrode of the light-emitting body 21 can abut against the first conductive terminal 11, so that the positive electrode of the light-emitting body 21 is electrically connected with the first conductive terminal 11. The negative electrode of the light-emitting body 21 can abut against the second conductive terminal 12, so that the negative electrode of the light-emitting body 21 is electrically connected with the second conductive terminal 12. In another embodiment, the positive electrode of the light-emitting body 21 can be plugged into the first conductive terminal 11, and the negative electrode of the light-emitting body 21 can be inserted into the second conductive terminal 12.

In the present application, the block 22 is hermetically installed in the first through hole 232; when the bulb assembly 2 is installed on the lamp holder assembly 1, the lamp holder 13 is sleeved on the block 22 and the lamp housing 23, and the end of the block 22 away from the light-emitting body 21 extends into the plug hole 131; the positive electrode of the light-emitting body 21 is connected with the first conductive terminal 11 after passing through the block 22, and the negative electrode of the light-emitting body 21 is connected with the second conductive terminal 12 after passing through the block 22. In this way, the electrical connection between the positive electrode of the light-emitting body 21 and the first conductive terminal 11, and the electrical connection between the negative electrode of the light-emitting body 21 and the second conductive terminal 12 are realized. In the present application, it is not required to provide an aluminum negative sleeve with external threads on the lamp housing 23, thereby reducing the manufacturing process and cost of the bulb assembly 2 and facilitating the automatic production of the bulb assembly 2 in batches. In addition, the bulb assembly 2 is directly sleeved on the block 22 and the housing, so that the disassembly between the lamp holder assembly 1 and the bulb assembly 2 is simple and easy.

In an embodiment, as shown in FIGS. 1 and 3, the bulb assembly 2 further includes a housing sleeve 24 provided with a second through hole 241, and the housing sleeve 24 is sleeved on the lamp housing 23 through the second through hole 241; the lamp holder 13 is sleeved on the block 22 and the housing sleeve 24 through the plug hole 131. Understandably, the housing sleeve 24 may be sleeved on the lamp housing 23 through a threaded structure, a clamping structure and the like.

The block 22 includes a sealing blocking part 221, an insertion part 222 and abutting part 223 connected between the sealing blocking part 221 and the insertion part 222. The outer diameter of the abutting part 223 is larger than that of the sealing blocking part 221 and the insertion part 222; the sealing blocking part 221 is hermetically installed in the first through hole 232, the insertion part 222 is inserted into the plug hole 131, and the housing sleeve 24 presses the abutting part 223 against the lamp housing 23. Understandably, the inner diameter of the opening of the second through hole 241 is smaller than the outer diameter of the abutting part 223. Hence, the housing sleeve 24 presses the sealing blocking part 221 into the first through hole 232 through the abutting part 223, and the opposite ends of the abutting part 223 are respectively abutted against the top of the lamp housing 23 and the inner wall of the second through hole 241. In this embodiment, the design of the housing sleeve 24 ensures the stability of the block 22 installed in the first through hole 232.

Figure 5:
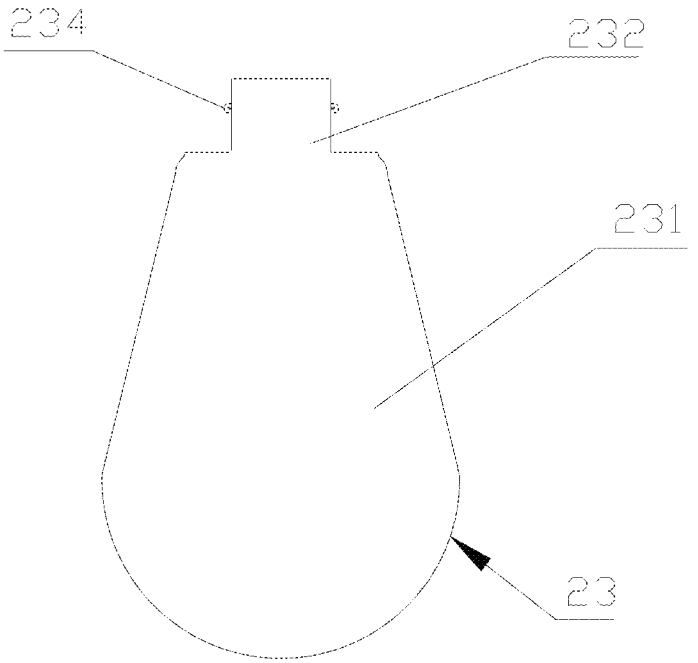
FIG. 5 is a schematic diagram of a lamp housing of a lamp provided by an embodiment of the present application.
Figure 7:
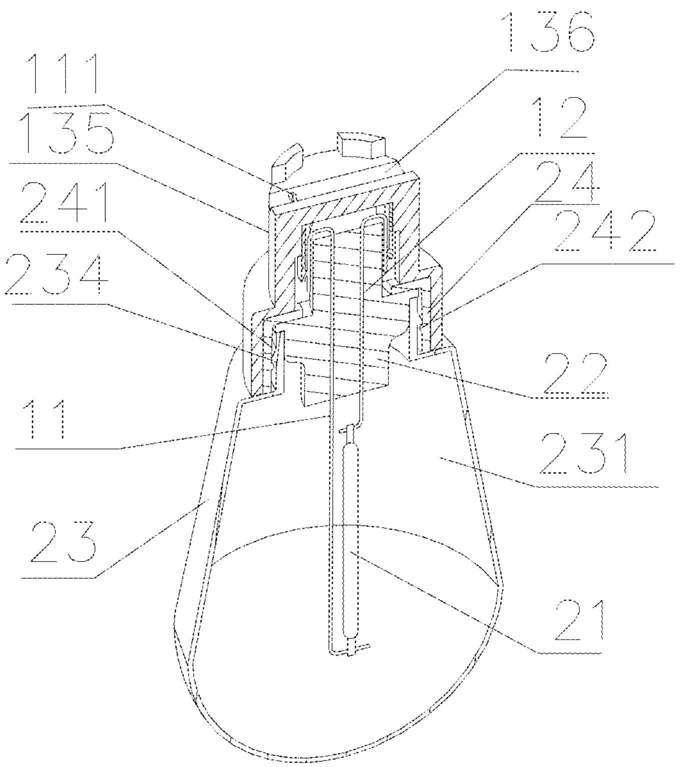
FIG. 7 is a section view of a lamp provided by an embodiment of the present application.

In an embodiment, as shown in FIGS. 3,5 and 7, a first clamping arm 234 is arranged on the outer wall of the lamp housing 23, and a second clamping arm 242 is arranged on the inner wall of the second through hole 241. The housing sleeve 24 is sleeved on the lamp housing 23 through the first clamping arm 234 and the second clamping arm 242 which are butted against each other. Understandably, the first clamping arm 234 extends towards the outside of the lamp housing 23, and the second clamping arm 242 extends towards the center of the second through hole 241. When the housing sleeve 24 is sleeved on the lamp housing 23, the first clamping arm 234 is positioned below the second clamping arm 242 and abuts against the second clamping arm 242. In this way, the first clamping arm 234 and the second clamping arm 242 abutting against each other can prevent the housing sleeve 24 from falling off the lamp housing 23, and ensure the stability of the housing sleeve 24 being sleeved on the lamp housing 23.

In an embodiment, as shown in FIGS. 1 to 3, the bulb assembly 2 further includes a locking fastener 25, the locking fastener 25 is sleeved on the housing sleeve 24 and connected to the lamp holder 13. It can be understood that the locking fastener 25 is fixedly sleeved on the housing sleeve 24, and the locking fastener 25 can play the role of fixedly connecting the housing sleeve 24 to the lamp holder 13, thus ensuring the stability of the lamp holder assembly 1.

In an embodiment, as shown in FIGS. 1 to 3, the locking fastener 25 is provided with a locking convex arm 251, and the lamp holder 13 is provided with a locking hole 132, and the locking fastener 25 is connected with the lamp holder 13 through the locking convex arm 251 inserted into the locking hole 132. Understandably, the locking convex arm 251 extends upward; when the lamp holder 13 is sleeved on the block 22 and the lamp housing 23, the locking convex arm 251 would be inserted into the lock hole 132, so that the locking fastener 25 can fix the lamp holder 13 on the lamp housing 23. In this embodiment, the locking fastener 25 is simple in structure and convenient to assemble and disassemble.

In an embodiment, the lamp holder 13 is also provided with a clamping groove 136 communicating with the plug hole 131, and the end of the first conductive terminal 11 away from the light-emitting body 21 is provided with a first needle 111 extending into the clamping groove 136, and the end of the second conductive terminal 12 away from the light-emitting body 21 is provided with a second needle 121 extending into the clamping groove 136. Understandably, the plug hole 131 is vertically arranged on the lamp holder 13, and the clamping groove 136 is horizontally arranged on the lamp holder 13.

Figure 6:
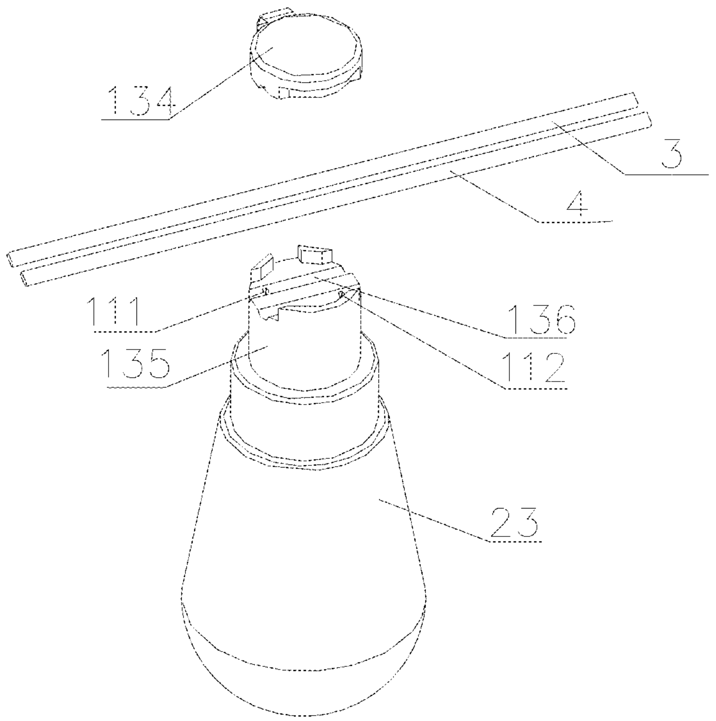
FIG. 6 is a schematic diagram of a holder cover and holder body of a lamp provided by an embodiment of the present application.

As shown in FIG. 6, the lamp further includes a first wire 3 and a second wire 4 clamped in the clamping groove 136, the first needle 111 is inserted into the first wire 3 and electrically connected with the first wire 3, and the second needle 121 is inserted into the second wire 4 and electrically connected with the second wire 4. Understandably, the first wire 3 and the second wire 4 may be live wire and zero wire respectively, and may also be positive electrode wire and negative electrode wire respectively. The first wire 3 and the second wire 4 may be attached together, and after the first wire 3 and the second wire 4 pass through the clamping groove 136, the first needle 111 pierces the sheath of the first wire 3 and is electrically connected with the first wire 3, so that the first wire 3 is electrically connected with the positive electrode of the light-emitting body 21 through the first conductive terminal 11; the second needle 121 pierces the sheath of the second wire 4 and is electrically connected with the second wire 4, so that the second wire 4 is electrically connected with the negative electrode of the light-emitting body 21 through the second conductive terminal 12. In this embodiment, the design of the first needle 111 and the second needle 121 improves the convenience of connecting the first wire 3 and the second wire 4 with the lamp holder assembly 1.

Further, a plurality of the lamp holder assemblies 1 may be connected to the first wire 3 and the second wire 4, and each lamp holder assembly 1 may be equipped with one bulb assembly 2, so that the lamp bead could form a lamp string.

In an embodiment, as shown in FIG. 6, the lamp holder 13 includes a holder cover 134 and a holder body 135 provided with the plug hole 131 and the clamping groove 136; the holder cover 134 is closed in the clamping groove 136 and used for pressing the first wire 3 and the second wire 4 in the clamping groove 136. Understandably, the upper end of the clamping groove 136 is an open structure, and the first wire 3 and the second wire 4 may be clamped in the clamping groove 136 through the opening at the upper end, the holder cover 134 covers the opening of the clamping groove 136, and the holder cover 134 may also play a role in pressing the first wire 3 and the second wire 4 in the clamping groove 136.

In an embodiment, as shown in FIGS. 1 and 2, the lamp holder 13 is provided with a hook 133. Further, the hook 133 is arranged on the holder cover 134, and the hook 133 can facilitate the lamp to be hung on external objects (branches, etc.), thus improving the convenience of the lamp installation.

Figure 4:
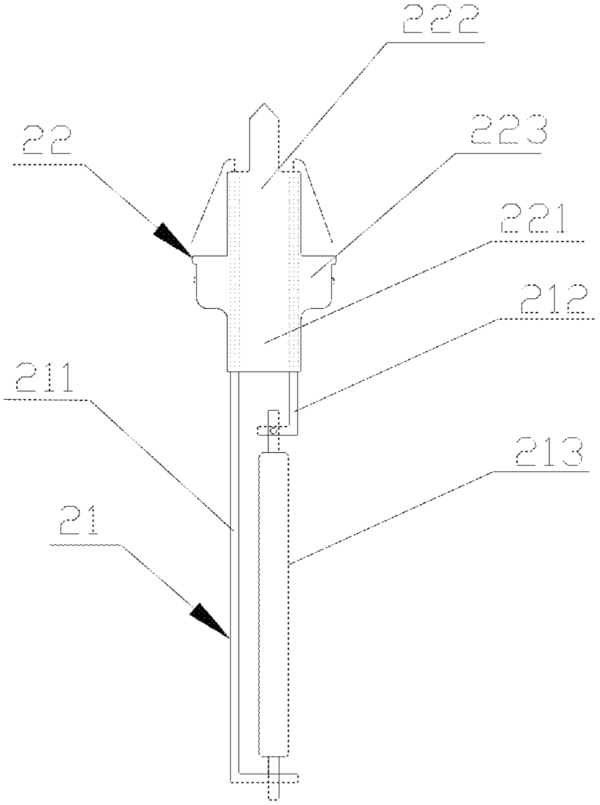
FIG. 4 is a schematic diagram of a light-emitting body of a lamp installed on a block according to an embodiment of the present application.

In an embodiment, as shown in FIG. 4, the light-emitting body 21 includes a first conductive bracket 211, a second conductive bracket 212 and an LED lamp bead 213 installed between the first conductive bracket 211 and the second conductive bracket 212, the first conductive bracket 211 is connected to the first conductive terminal 11 through the block 22, and the second conductive bracket 212 is connected to the second conductive terminal 12 through the block 22.

It can be understood that both the first conductive bracket 211 and the second conductive bracket 212 are made of conductive materials, and the first conductive bracket 211 and the second conductive bracket 212 can play a role in facilitating the installation of the LED lamp bead 213 in the internal space 231.

The above descriptions are merely preferred embodiments of the connection structure of string light of the present application, but not intended to limit the present application. Any modifications, equivalent substitutions and improvements made within the spirit and principle of the present application shall be included in the protection scope of the present application.

What is claimed is:

1. A lamp, comprising a lamp holder assembly and a bulb assembly; wherein the lamp holder assembly comprises a first conductive terminal, a second conductive terminal and a lamp holder provided with a plug hole, both the first conductive terminal and the second conductive terminal are installed on an inner wall of the plug hole;

the bulb assembly comprises a light-emitting body, a block and a lamp housing, the lamp housing is provided with an internal space and a first through hole communicating with the internal space, the block is hermetically installed in the first through hole, and the light-emitting body is installed in the internal space through the block;

when the bulb assembly is installed on the lamp holder assembly, the lamp holder is sleeved on the block and the lamp housing through the plug hole, a first output end of the light-emitting body passes through the block and is connected with the first conductive terminal, and a second output end of the light-emitting body passes through the block and is connected with the second conductive terminal;

the lamp holder is further provided with a clamping groove communicating with the plug hole, an end of the first conductive terminal away from the light-emitting body is provided with a first needle extending into the clamping groove, and an end of the second conductive terminal away from the light-emitting body is provided with a second needle extending into the clamping groove;

the lamp also comprises a first wire and a second wire clamped in the clamping groove, the first needle is inserted into the first wire and electrically connected with the first wire, and the second needle is inserted into the second wire and electrically connected with the second wire; and the lamp holder comprises a holder cover and a holder body provided with the plug hole and the clamping groove, the holder cover covers the clamping groove and is used for pressing the first wire and the second wire in the clamping groove.

2. The lamp of claim 1, wherein the bulb assembly further comprises a housing sleeve provided with a second through hole, and the housing sleeve is sleeved on the lamp housing through the second through hole; the lamp holder is sleeved on the block and the housing sleeve through the plug hole; and the block comprises a sealing blocking part, an insertion part and abutting part connected between the sealing blocking part and the insertion part, and an outer diameter of the abutting part is larger than that of the sealing blocking part and the insertion part; the sealing blocking part is hermetically installed in the first through hole, the insertion part is inserted in the plug hole, and the housing sleeve presses the abutting part on the lamp housing.

3. The lamp of claim 2, wherein an outer wall of the lamp house is provided with a first clamping arm, and an inner wall of the second through hole is provided with a second clamping arm, and the housing sleeve is sleeved on the lamp housing through the first clamping arm and the second clamping arm which are butted against each other.

4. The lamp of claim 2, wherein the bulb assembly further comprises a locking fastener, the locking fastener is sleeved on the housing sleeve and connected with the lamp holder.

5. The lamp of claim 4, wherein the locking fastener is provided with a locking convex arm, the lamp holder is provided with a lock hole, and the locking fastener is connected with the lamp holder through the locking convex arm inserted into the lock hole.

6. The lamp of claim 1, wherein the lamp holder is provided with a hook.

7. The lamp of claim 1, wherein the light-emitting body comprises a first conductive bracket, a second conductive bracket and an LED lamp bead installed between the first conductive bracket and the second conductive bracket, the first conductive bracket passes through the block and is connected with the first conductive terminal, and the second conductive bracket passes through the block is connected with the second conductive terminal.

8. The lamp of claim 1, wherein the lamp housing is a plastic part.

* * * * *